(12) United States Patent
Mayor

(10) Patent No.: US 8,578,260 B2
(45) Date of Patent: Nov. 5, 2013

(54) APPARATUS AND METHOD FOR REFORMATTING A REPORT FOR ACCESS BY A USER IN A NETWORK APPLIANCE

(75) Inventor: Ian Anthony Mayor, Paris (FR)

(73) Assignee: Business Objects Software Limited, Dublin (IE)

( * ) Notice: Subject to any disclaimer, the term of this patent is extended or adjusted under 35 U.S.C. 154(b) by 994 days.

(21) Appl. No.: 11/966,641

(22) Filed: Dec. 28, 2007

(65) Prior Publication Data

US 2009/0172525 A1 Jul. 2, 2009

(51) Int. Cl.
*G06F 17/00* (2006.01)
(52) U.S. Cl.
USPC .......... 715/204; 715/253; 715/255; 715/273; 715/807
(58) Field of Classification Search
USPC .......... 715/230, 249, 255, 273, 204, 253, 807
See application file for complete search history.

(56) References Cited

U.S. PATENT DOCUMENTS

| | | | |
|---|---|---|---|
| 7,599,952 B2 * | 10/2009 | Parkinson | 1/1 |
| 7,814,092 B2 * | 10/2010 | Ramsey et al. | 707/713 |
| 7,860,878 B2 * | 12/2010 | Thrall et al. | 707/766 |
| 8,015,019 B1 * | 9/2011 | Smith et al. | 705/1.1 |
| 2003/0023476 A1 * | 1/2003 | Gainey | 705/10 |
| 2003/0031996 A1 * | 2/2003 | Robinson | 434/350 |
| 2004/0210555 A1 * | 10/2004 | Naimark et al. | 707/1 |
| 2005/0071741 A1 * | 3/2005 | Acharya et al. | 715/500 |
| 2005/0246391 A1 * | 11/2005 | Gross | 707/200 |
| 2007/0112668 A1 * | 5/2007 | Celano et al. | 705/38 |
| 2007/0113261 A1 * | 5/2007 | Roman et al. | 725/134 |
| 2008/0294584 A1 * | 11/2008 | Herz | 706/46 |
| 2009/0037400 A1 * | 2/2009 | Cragun et al. | 707/5 |
| 2009/0193337 A1 * | 7/2009 | Carter et al. | 715/277 |
| 2009/0234878 A1 * | 9/2009 | Herz et al. | 707/102 |
| 2012/0072291 A1 * | 3/2012 | Bharat | 705/14.66 |

OTHER PUBLICATIONS

Graham, Paul. "A Plan for Spam". 2002. Web. Aug. 2002. Accessed Apr. 23, 2013. http://www.paulgraham.com/spam.html.
Jensen, H. "Combating the Perception of Bloat (Why the UI, Part 3)". *MSDN Blogs*. MSDN. Mar. 31, 2006. Web. Accessed Apr. 23, 2013. http://blogs.msdn.com/b/jensenh/archive/2006/03/31/565877.aspx.

* cited by examiner

*Primary Examiner* — Stephen S. Hong
*Assistant Examiner* — Matthew Ludwig
(74) *Attorney, Agent, or Firm* — Mintz Levin Cohn Ferris Glovsky and Popeo, P.C.

(57) ABSTRACT

A computer readable storage medium comprises executable instructions to receive a report for access by a user. The report is divided into sections and each section is tokenized based on the user's interests. A section score is calculated for each section in the report. One or more sections are selected for display to the user according to their section scores. The one or more sections are delivered to the user.

28 Claims, 8 Drawing Sheets

APPARATUS AND METHOD FOR REFORMATTING A REPORT FOR ACCESS BY A USER IN A NETWORK APPLIANCE

BRIEF DESCRIPTION OF THE INVENTION

This invention relates generally to report reformatting. More particularly, this invention relates to techniques for reformatting reports for display to show the key information in the reports based on user interactions with the reports.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, such as relational, Online Transaction Processing ("OLTP") and Online Analytic Processing ("OLAP") databases, and performance management applications to provide business metrics, dashboards, and scorecards, as well as best-practice analysis techniques for gaining business insights.

In many organizations, data is stored in multiple formats and data sources that are not readily compatible. Data sources include sources of data that enable data storage and retrieval. Data sources may include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity ("ODBC") and the like. Data sources may also include a data source where the data is not stored like data streams, broadcast data, and the like. Data sources are comprised of values and objects, such as dimensions, columns, rows, attributes, measures and the like, otherwise referred to as data model objects.

Because of the complexities of organizational data and their underlying data sources, it is advantageous to work with data within a semantic context. This can be accomplished by using a level of semantic abstraction that provides terms and abstract logic associated with the underlying data in order to manage, manipulate and analyze the data. A semantic layer or domain is the term for a level of abstraction based on a relational, OLAP, or other data source or a combination of more than one data sources or existing semantic layers. The semantic layer includes data model objects that describe the underlying data sources and define dimensions, attributes and measures that can be applied to the underlying data sources and data foundation metadata that describes a connection to, structure for, and aspects of the underlying data sources.

A semantic layer can be used as a level of abstraction to combine partial data sets from any number of original data sources. A semantic layer can also be used to provide logical sets to which data can be associated so that data from a wide number of sources can be meaningfully aggregated. Metadata concerning the data, such as a value for data freshness, can also be associated with the data within the logic of a semantic domain. Semantic domain technology is disclosed in the following commonly-owned U.S. Pat. Nos. 5,555,403; 6,247,008; 6,578,027; and 7,181,435, which are incorporated herein by reference.

Typically, a data model object is assigned a common business term such that the user does not need to understand the specific logic of the underlying data source but can work with familiar terminology when constructing queries or otherwise accessing the data. Examples of common business terms include customer, employee, product line, revenue, profit, attrition, fiscal year, quarter, and the like.

For example, organizational data for a retail institution may be distributed among an OLTP database for storing sales transactions, a relational database for storing data pertaining to customers, an OLAP database for storing financial data according to geographical regions, time period, and products, and various spreadsheets storing sales performance figures for each member of the sales team. The data may be stored as various data objects spread among the different data sources, for example, the OLTP data source may store data objects such as "quantities sold" and "products sold," the relational database may store data objects such as "customer names" and "customer addresses," and the OLAP database may store data objects such as "revenues per region," "revenues per quarter," and so on. Retrieving data for analysis may therefore require multiple queries to multiple data sources.

There are a number of commercially available tools that can retrieve data from multiple data sources automatically. These tools can also integrate the data into a single "report" to facilitate analysis of the retrieved data. A report refers to information automatically retrieved (i.e., in response to computer executable instructions) from a data source, where the information is structured in accordance with a report schema that specifies the form in which the information is presented in the report. For example, Business Objects™ of San Jose, Calif., sells a number of widely used report generation tools, including Crystal Reports™, Business Objects Voyager™, Business Objects Web Intelligence™, and Business Objects Enterprise™.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata). Unlike other non-report documents that are constructed without the automatic retrieval of data from a data source but may optionally import external data within a document, e.g., word processor and presentation documents, a report by design is primarily a medium for accessing, formatting, transforming, and/or presenting external data.

Data in a report may be formatted in a variety of structures, including, but not limited to, table structures, sections, cross-tables, synchronized tables, sub-reports, hybrid charts, and the like. A report can interpret the data therein and perform calculations based on the original (or a redefined) data structure and meaning of the imported data as well as on preexisting relationships between elements of imported data. The report generation tools may support a range of calculation models.

Reports may be large because of the amount of data retrieved and the number of computations required for presenting the data to a user. Using the retail institution example above, consider a regional manager trying to access sales performance for a given region. The regional manager may have to periodically generate a report with sales revenue for various stores within the region. The report may list customer information, sales associate information, store information, region information, and quantities sold for various products and brands, and the like.

With so much information to display, viewing the report may become cumbersome. For example, consider the regional manager traveling to different stores within a region. The regional manager may desire to view the report while traveling from store to store. The regional manager may have a personal digital assistant, portable computer, handheld mobile device, or other network appliance capable of accessing and displaying documents. Because these devices are compact and equipped with small screens with limited display capabilities, the regional manager may not be able to view the entire report in a single screen. Instead, the regional manager may have to navigate through several screens, either by scrolling, touching, or clicking actions, to view the entire report. Furthermore, if the regional manager is interested in only key portions of the report, the regional manager may have to navigate the entire report before accessing the information desired.

Accordingly, it would be desirable to provide techniques to reformat reports for access by a user in a network appliance. In particular, it would be desirable to provide techniques that reformat reports for display in network appliances to show the key information desired by users.

SUMMARY OF THE INVENTION

The invention includes a computer readable storage medium with executable instructions to receive a report for access by a user. The report is divided into sections and each section in the report is tokenized based on the user's interests. A section score is calculated for each section in the report. One or more sections are selected for display to the user according to their section scores. The one or more sections are delivered to the user.

The invention also includes a computer readable medium with executable instructions to generate an index associated with a user's interests in report tokens. A report is received for access by a user and the report is divided into sections. A section score is determined for each section in the report based on the index. One or more sections are selected for display to the user according to a criterion based on their section scores.

The invention further includes a method for reformatting a report for access by a user in a network appliance. A report is received for access by the user in the network appliance. The report is divided into sections. An index of user's interests is accessed in the network appliance. One or more sections in the report of interest to the user are identified based on the index. The one or more sections are displayed to the user in the network appliance. User interactions with the one or more sections in the network appliance are monitored. The index is updated based on the user interactions.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

Figure 1:
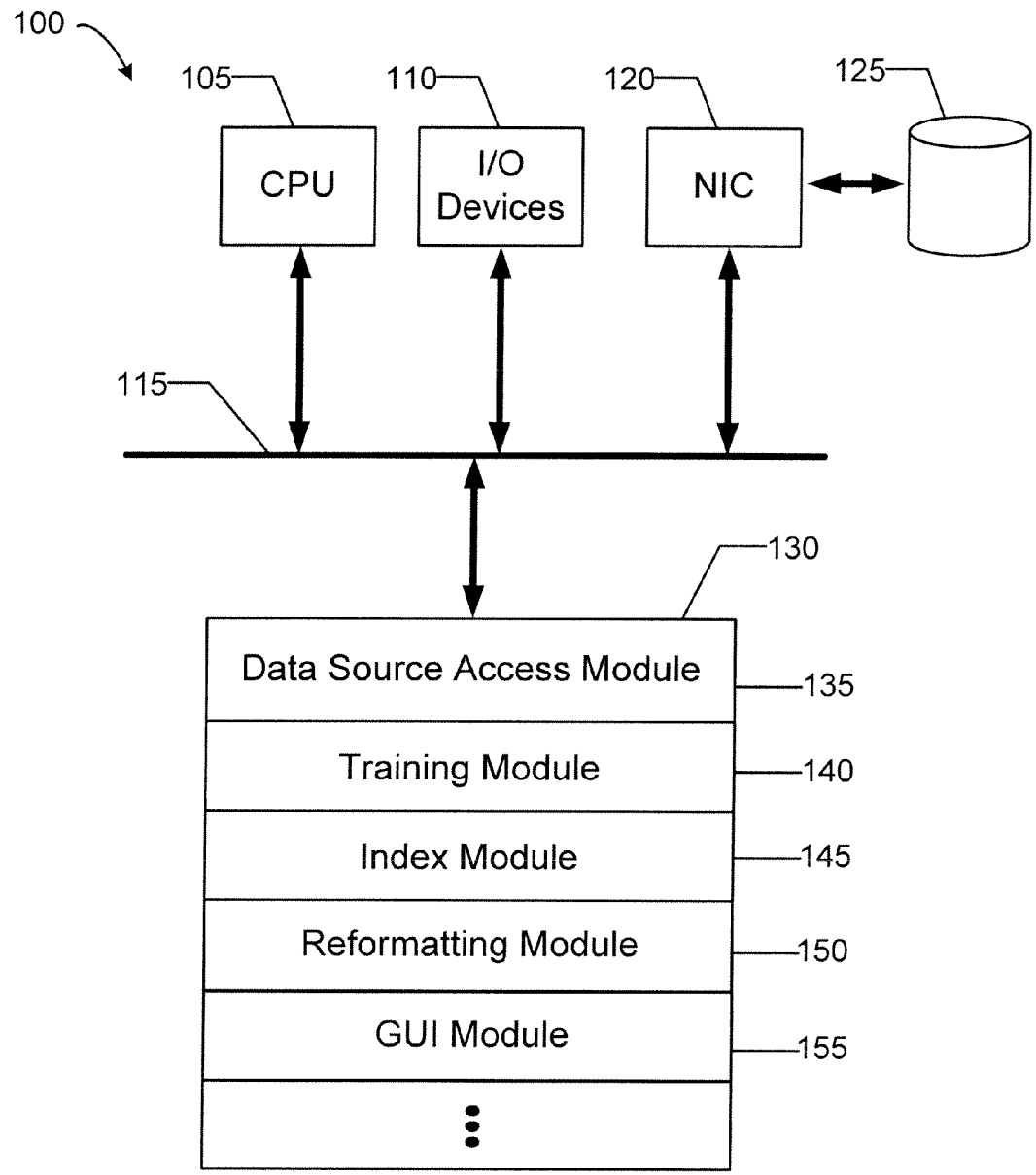
FIG. 1 illustrates a network appliance constructed in accordance with an embodiment of the invention.

The present invention provides a system, method, software arrangement, and computer readable storage medium for reformatting a report for access by a user in a network appliance. As generally used herein, a network appliance refers to an electronic device configured with a network access system and capable of displaying documents. The network access system may be a wired or a wireless connection to a network such as the Internet. Network appliances include, but are not limited to, microprocessor based devices such as personal and portable computers, handheld appliances such as a host of mobile devices including mobile telephones, personal digital assistants, electronic organizers, and the like, entertainment devices, or any other device capable of accessing a network.

According to an embodiment of the invention, reports accessed by a network appliance may be available locally or via a network. In one embodiment, reports may be stored in a repository server that stores information about a Business Intelligence server and the objects related to Business Intelligence (such as reports, data connections, server architecture, semantic layers, predefined business objects, queries, and the like). The repository server can also act as a metadata source.

Reports accessed by a network appliance are reformatted for display according to a user's interests. In one embodiment, the user's interests are identified based on the user's interactions with the reports, for example, based on the user's highlighting, clicking, hovering, revealing, and extended viewing. Each report is scanned to identify "report tokens" for tracking the user's interests.

A report token, as generally used herein, may be an individual word of a text element in a report, for example, "Revenue", "Country", and the like, that may be the basis of a user interaction with the report. A text element, as generally used herein, may include fixed text elements (i.e. a section header or label) and text elements from database field values and formula results. Numeric values, dates, images and currency values are not counted as text elements. Charts and graphs are considered to be text elements, with the title of the chart being the value for the text element.

According to an embodiment of the invention, a user's interests in report tokens are determined by monitoring the user's interactions with reports during a training period. Each report accessed by the user during the training period is tokenized, i.e., segmented into report tokens, to generate an interest score for each report token. An index of report tokens and their interest scores is stored after the training period and used for all reports subsequently accessed by the user. The index of report tokens is updated after each report viewing to keep track of the user's interests when interacting with reports.

Once the index of report tokens is generated, each report accessed by a user is reformatted for display on the network appliance based on the index. In one embodiment, reformatting a report for display involves sectioning the report, tokenizing each section in the report, and identifying sections of interest to the user based on the index. The sections of interest to the user are identified by generating a section score for each section based on the interest scores of the report tokens in each section and evaluating the section scores according to a criterion, for example, by choosing all sections with scores above a given threshold, by choosing only the top scoring sections, and so on.

According to an embodiment of the invention, only those sections identified to be of interest to the user are delivered to the user and displayed on the network appliance. The user's interactions with the displayed report are monitored to update the index of user's interests. The index is updated after the user has finished viewing the displayed report, i.e., after the user has closed the report. Updating the index after each report viewing ensures that the index accurately reflect the user's interests at any given time. This enables the user to seamlessly access large reports on small display screens and focus only on the key information in the reports.

FIG. 1 illustrates a network appliance configured in accordance with an embodiment of the invention. Network appliance 100 includes standard components, including a Central Processing Unit ("CPU") 105 and input/output devices 110, which are linked by a bus 115. Input/output devices 110 may include a keyboard, mouse, display screen, monitor, printer, and the like.

Network Interface Circuit ("NIC") 120 may also be connected to the bus 115. NIC 120 provides connectivity to a wired or a wireless network (not shown), thereby allowing network appliance 100 to operate in a networked environment. For example, networked data sources 125 are connected to network appliance 100 through NIC 120. In accordance with an embodiment of the invention, networked data sources 125 may include any number and type of data sources, such as, for example, OLAP, OLTP and relational databases, among others.

Memory 130 is also connected to the bus 115. In one exemplary embodiment, memory 130 stores one or more of the following modules: a Data Source Access module 135, a Training module 140, an Index module 145, a Reformatting module 150, and a GUI module 155.

Data Source Access module 135 may include executable instructions to access one or more data sources, e.g., networked data sources 125. These data sources may store one or more of the reports accessed by users, the data for the reports, and the index of user's interests in report tokens. One of ordinary skill in the art appreciates that any of these may also be stored locally in network appliance 100. The data sources may be available locally or via a network.

Training module 140 may include executable instructions for monitoring a user's interactions with reports and generating (or updating) an index of user's interests in report tokens, as described in more detail herein below. Index module 145 may be a persistent store which contains the index of report tokens and their interest scores generated by Training module 140. One of ordinary skill in the art appreciates that Index module 145 is shown to reside locally on network appliance 100 but may reside in an external data source available via the network.

Reformatting module 150 is responsible for reformatting a report for display on the network appliance according to the index of user's interests in report tokens. As described in more detail herein below, reformatting a report for display involves sectioning the report, tokenizing each section in the report, and identifying sections of interest to the user based on the index.

GUI module 155 may rely upon standard techniques to produce graphical components of a user interface, e.g., windows, icons, buttons, menu and the like, for accessing and managing data in networked data sources 125 or other data sources stored locally in network appliance 100 or available via the network.

It is appreciated that the executable modules stored in memory 130 are exemplary. It is also appreciated that the functions of the modules may be combined. In addition, the functions of the modules need not be performed on a single network appliance. Instead, the functions may be distributed across a network, if desired. Indeed, the invention may be commonly implemented in a client-server environment with various components being implemented at the client-side and/or the server-side. As understood by those of ordinary skill in the art, it is the functions of the invention that are significant, not where they are performed or the specific manner in which they are performed.

One of ordinary skill in the art appreciates that the functions of modules 135-150 may be performed at network appliance 100 or at a server connected to network appliance 100. In one exemplary embodiment, some or all of the functions of modules 135-150 may be performed at network appliance 100. In another exemplary embodiment, some or all of the functions of modules 135-150 may be performed at a server connected to network appliance 100. For example, the server may receive a report for access by a user and reformat the report according to the index generated by the Training module 140 and stored at Index module 145 to extract the sections of interest to the user. Those sections of interest may then be delivered to the user for display at the network appliance 100.

Figure 2:
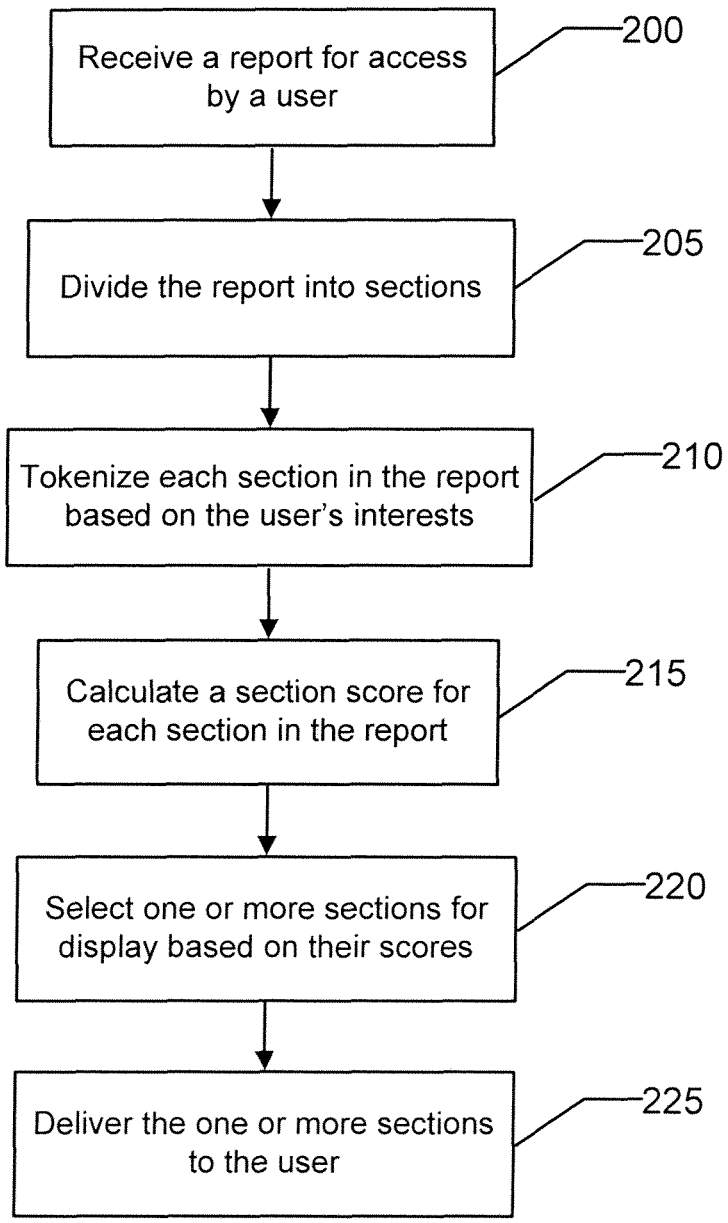
FIG. 2 illustrates a flow chart for reformatting a report for display on a network appliance in accordance with an embodiment of the invention.

Referring now to FIG. 2, a flow chart for reformatting a report for display on a network appliance in accordance with an embodiment of the invention is described. The operations of FIG. 2 may be implemented using the Reformatting module 150 either independently or in conjunction with GUI module 155. Initially, a report is received by network appliance 100 for access by a user (200). The report may be accessed from a data source external to network appliance 100 and available via the network, e.g., networked data sources 125, or from a data source stored locally within network appliance 100.

Next, the report is divided into sections (205). In one embodiment, the sections may represent logical sections delimited by natural divisions in the report, such as page breaks, section breaks, group changes, and the like. Sections may also be delimited automatically at fixed intervals, e.g., at a number of lines. One of ordinary skill in the art appreciates that the sections in a report should be small enough not to occupy the entire display screen of the network appliance so more than one section can be displayed at any given time.

Each section in the report is then tokenized according to the user's interests (210). Tokenization of a section involves identifying the report tokens within the section and assigning interest scores for the report tokens based on the index. In one embodiment, report tokens may be individual words within text elements of the report. Their interest scores are either taken directly from the index for those report tokens already included therein or are initialized at zero for those report tokens encountered for the first time within the section and not previously included in the index.

A token table containing the report tokens within the section and their interest scores is built for each section in the report. Each section in the report is then assigned a section score (215). The section score for a given section is calculated by sorting its token table by score and averaging the scores of a portion, e.g., the top 10, or of all of the report tokens within the section. In one embodiment, the section score is calculated based on how many tokens have a score within a specified range, e.g., greater than 20.

One or more sections of the report are selected for display based on their scores (220). The one or more sections are then delivered to the user for display at the network appliance (225). In one embodiment, the sections selected for display are identified according to a criterion based on their scores. The criterion may be, for example, a thresholding criterion for selecting those sections for display whose scores are above a threshold, or a ranking range criterion for selecting those sections for display with the top N, e.g., the top 10, scores.

It is appreciated that those sections deemed uninteresting to the user, i.e., those sections whose scores did not meet the display criterion, may be hidden from the user. According to an embodiment of the invention, those hidden sections may be displayed upon request by the user. The user may also specify a different criterion for display as desired, i.e., the display criterion may be adapted to the needs of the user and specified accordingly.

Figure 3:
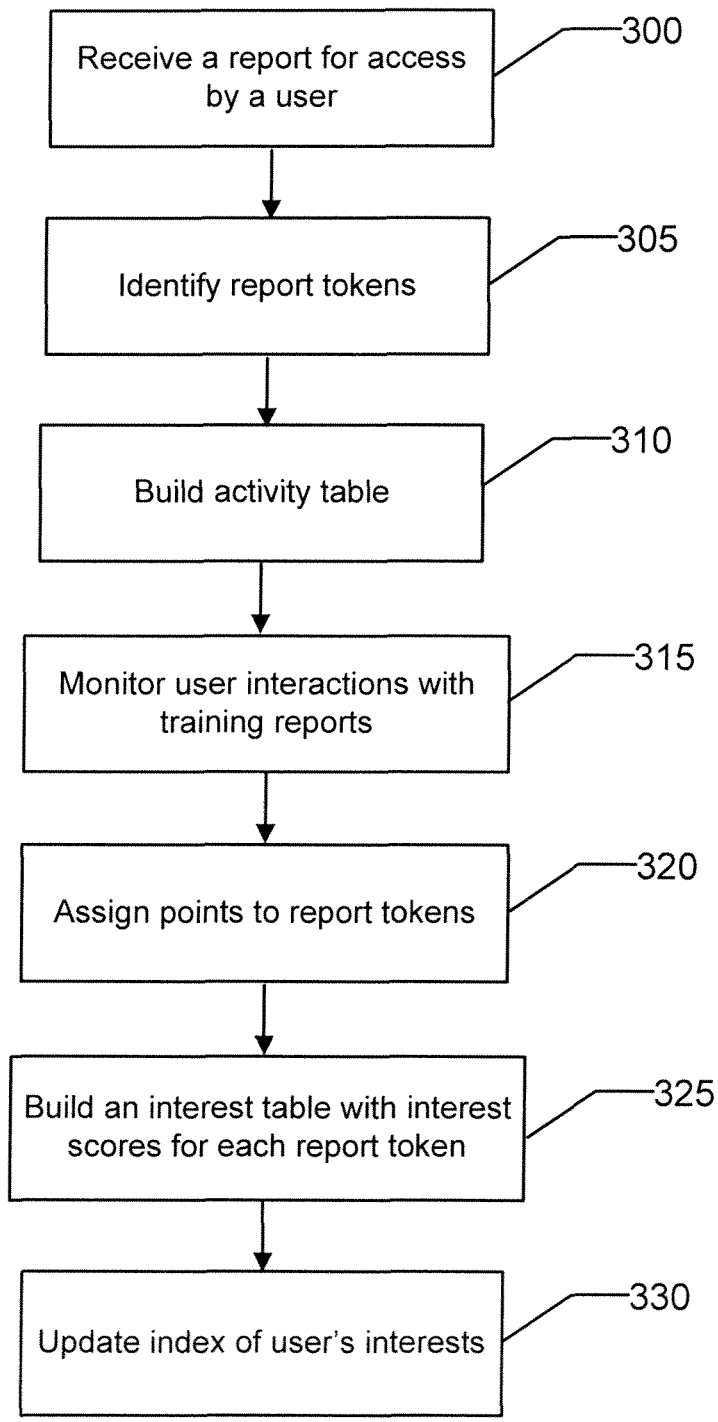
FIG. 3 illustrates a flow chart for generating (or updating) an index of user's interests in report tokens in accordance with an embodiment of the invention.

Referring now to FIG. 3, a flow chart for generating (or updating) an index of user's interests in report tokens in accordance with an embodiment of the invention is described. The operations of FIG. 3 may be implemented using the Training module 140 either independently or in conjunction with GUI module 155. An initial training period is specified to generate the index of user's interests. The initial training period may be specified as a time period during which the user accesses a number of reports, or it may be delimited by a given number of reports. For example, training may occur for the first N. e.g., 5, 10, 15, etc., reports accessed by the user on the network appliance. Each report in the initial training period is subject of a training session during which the index is updated to reflect the user's interactions with the report.

It is appreciated that during this initial training period, each report is displayed as is, i.e., without any reformatting. It is also appreciated that reports are reformatted only after the index of user's interests has been generated. Further, it is appreciated that Training module 140 both generates and updates the index after each report viewing.

In one embodiment, Training module 140 generates or updates an index for each user accessing reports on a given network appliance. That is, an index for a given network appliance is associated with, and unique for, each individual user. Further, in one embodiment, each network appliance may generate a different index for a given user. A user may therefore be associated with multiple unique indexes, with each unique index corresponding to a given network appliance accessed by the user. In one embodiment, the user is associated with a single unique index, which is updated when the user accesses reports on any network appliance.

As described herein above, the index may be a local persistent store in the network appliance or it may be stored elsewhere in the network. For example, the index may be stored in a repository server that stores information about a Business Intelligence server and the objects related to Business Intelligence (such as reports, data connections, server architecture, semantic layers, predefined business objects, queries, and the like). The repository server can also act as a metadata source.

An index for a given user and a given network appliance is generated as follows. First, a report is received for access by the user in the network appliance during the initial training period (300). Each report in the training period is then scanned to identify report tokens within the report (305). In one embodiment, a report token may be an individual word of a text element in the report, for example, "Revenue", "Country" and the like, that may be the basis of a user interaction with the report. A text element, as generally used herein, may include fixed text elements (i.e., a section header or label) and text elements from database field values and formula results. Numeric values, dates, images and currency values are not counted as text elements. Charts and graphs are considered to be text elements, with the title of the chart or graph being the value for the text element.

Each report token is included in an "activity table" (310). The activity table contains report tokens and activity scores associated with the report tokens. When a new report token is added to the activity table, its activity score is initialized to zero. Training module 140 monitors the user's interactions with the report to fill in the activity scores in the activity table (315). The activity scores are computed by assigning points to each report token associated with a user's interaction with the report, as described in more detail below with reference to FIG. 4 (320).

Once the user has finished interacting with the report during the training session, for example, by closing the report document on the network appliance, the activity scores gathered during monitoring are collated to generate an "interest score" for each report token. This is accomplished by creating an interest table for the report (325). Similar to the activity table, the interest table contains report tokens and associated interest scores. Entries are created in the interest table for each report token in the activity table that has a non-zero activity score.

The interest score for a given token is computed with a simple formula:

$$\text{Interest score} = \frac{\text{activity score}}{\text{total points assigned for the report}} \times 100 \qquad (1)$$

where the "activity score" corresponds to the activity score in the activity table for the given table and the "total points assigned for the report" corresponds to the total points assigned for all the report tokens identified in the report and subject of user interactions with the report during the training session.

Once the interest table is created for the report, the user's index associated with the network appliance is updated to reflect the user interactions with the report (330). This is accomplished by iterating over the interest table for each token found in that table and updating that token's score in the index as follows:

token score=(token score)×(1−weight)+(interest score)×weight     (2)

where the "token score" corresponds to the token score assigned to the token in the index, "interest score" corresponds to the token score in the interest table, and "weight" corresponds to a weighing factor.

It is appreciated that the first time the index is updated to include a new report token, its token score is initialized to zero and the weight is initialized to one so that the first value for the token score included in the index for the new report token is simply the interest score for that token. From thereon, the weighting factor may be a function of the number of updates that have been done to the index since it was first created.

In one exemplary embodiment, the weighting factor may be reduced to 0.8 the second time the index is updated. For each subsequent time that the index is updated, the weight may decrease by 0.05 until it reaches 0.5. After reaching 0.5, the weight may decrease by 0.01 during each subsequent update to the index until it reaches 0.05. After reaching 0.05, the weight may stay constant and never decrease.

It is appreciated that a variable weight may be used to prevent a single training session from creating an overall bias in the training process. It is also appreciated that the weight may be assigned different values than those described above. For example, the weight may be selected by the user during training to emphasize a given report more than others. The weight may also be a function of the number of report tokens in the report, the time spent by the user interacting with the report, and so on.

Figure 4:
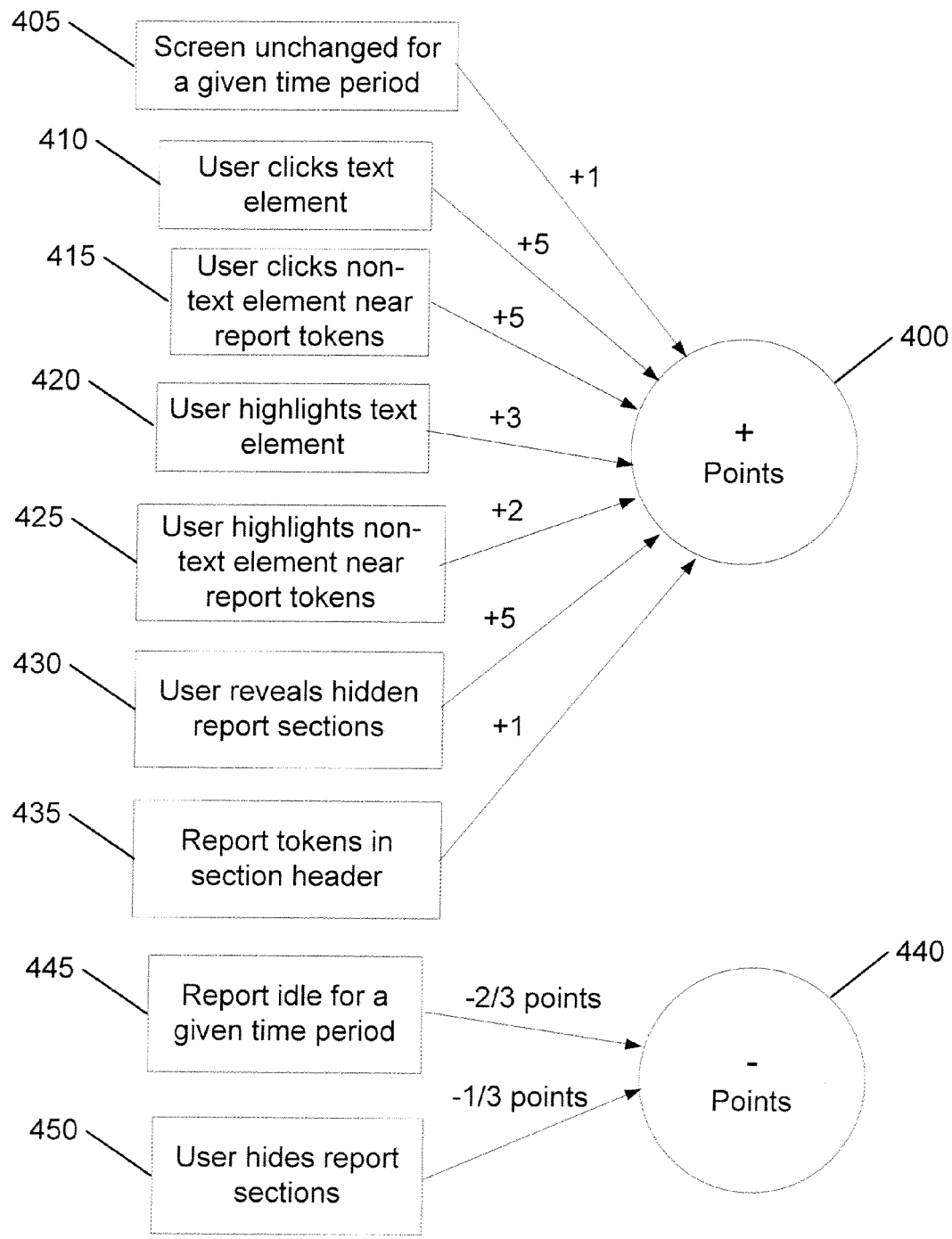
FIG. 4 illustrates a schematic diagram for assigning points to report tokens during the training period in accordance with an embodiment of the invention.

Referring now to FIG. 4, a schematic diagram for assigning points to report tokens during the training period in accordance with an embodiment of the invention is described. A report token within a given report can increase or decrease its activity score based on a number of actions performed by the user when interacting with the report. Each time one of these actions is performed by the user, report tokens may have their activity scores increased or decreased with points.

Points 400 can be added to report tokens when the user performs any of the actions 405-435. Action 405 represents the user analyzing the report without any changes occurring on the display screen for a given time period, e.g., 15 seconds. If the display screen remains unchanged during this given time period, each report token displayed on the display screen may receive a point. A point may be added for every given time period that the screen remains unchanged up to a maximum threshold, for example, 20 points may be added up to a maximum of 5 minutes.

Action 410 represents the user clicking on a text element. When that occurs, all report tokens in the text element may receive 5 points. Action 415 represents the user clicking on a non-text element. When that occurs, all report tokens that are in the nearest text element also may receive 5 points.

In one embodiment, the nearest text element may be the text element that is closest to the top left corner of the non-text element. The top left corner is chosen because, in typical report formats, most non-text elements have a text element above them, e.g., a title or brief description, or a field label to their left. If two text elements are similarly situated and close to the top left corner of the non-text element, the text element with larger font size or other distinct emphasizing features, e.g., underlined, in bold, etc., may be designated the nearest text element. It is appreciated that the nearest text element may be selected in different manners as desired.

Action 420 represents the user highlighting a text element. All report tokens within the highlighted text element may receive 3 points. Similarly, action 425 represents the user highlighting a non-text element. All report tokens in the nearest text element may receive 2 points.

Action 430 represents the user revealing a section hidden in the display screen of the network appliance. For example, a section may be hidden during training due to the small size of the display screen. In this case, a user may reveal a section by scrolling down or performing other action on the network appliance to display the hidden section in the display screen. All report tokens in the newly revealed section may receive 5 points.

Action 435 represents actions performed within a given section. Any report tokens in the header of a section containing report tokens that received points from one of the previously described actions 405-430 may receive a point.

Points 440 can also be deducted from report tokens when the user performs any of the actions 445-450. Action 445 represents the display screen being idle for more than the maximum time threshold discussed above with reference to action 405. For example, if more than 5 minutes have passed and the user has not interacted with the report at all, then each report token in the report may have two-thirds of the points awarded during that time deducted from their activity scores. Action 450 represents the user hiding a section displayed on the display screen of the network appliance. When this occurs, a certain number of points, e.g., one-third, may be deducted from the activity scores of all the report tokens within the section being hidden by the user.

It is appreciated that the number of points assigned to a particular action may be adapted as desired. It is also appreciated that the actions illustrated in FIG. 4 are shown for purposes of illustration only. Additional actions not shown in FIG. 4 may be used to modify the activity score for any given token. The actions may also depend on the network appliance where the reports are accessed. For example, users may not be able to click or highlight an item using certain network appliances but may be able to interact with a menu of options or with a keypad to manipulate the report.

Figure 5:
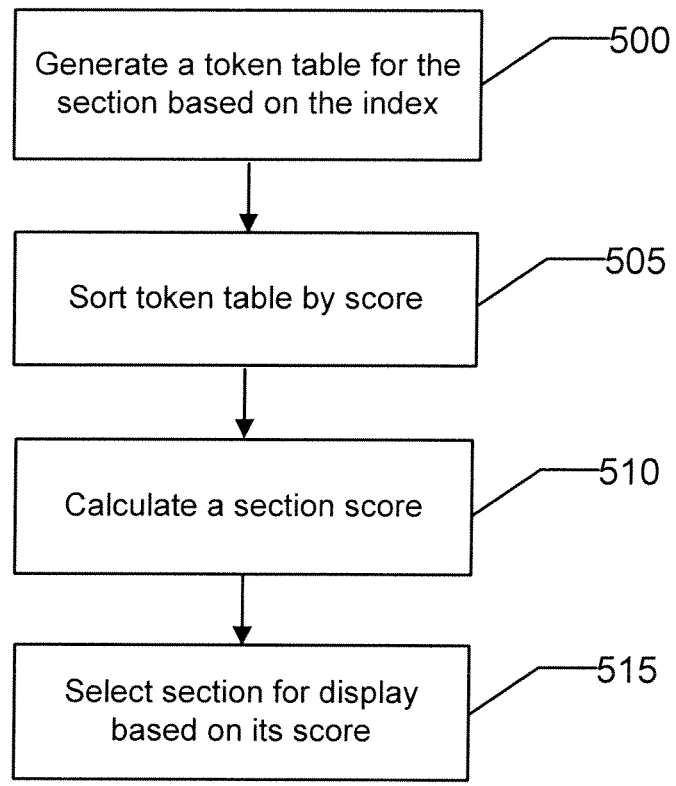
FIG. 5 illustrates a flow chart for tokenizing a section of a report in accordance to an embodiment of the invention.

Once the training session is over and the index of user's interests for a given network appliance is generated, each subsequent report accessed by the user is reformatted for display in the display screen based on the index. As described above with reference to FIG. 2, reformatting involves the tokenization of each section in the report. Referring now to FIG. 5, a flow chart for tokenizing and scoring a section of a report in accordance to an embodiment of the invention is described.

First, a token table is generated for the section based on the index (500). The token table contains all report tokens within the section and their interest scores. The interest scores are either taken directly from the index for those report tokens already included therein or are initialized at zero for those report tokens encountered for the first time within the section and not previously included in the index.

Once the section is tokenized, the section is scored by sorting the token table by score (505). The section score is computed by averaging the interest scores of the top N. e.g., the top 10, scoring tokens in the section (510). The section is selected for display according to its score (515). In one embodiment, the section is selected for display according to a criterion. The criterion may be, for example, a thresholding criterion. The sections with scores above a given threshold are selected for display. The sections with scores below the threshold are hidden to the user and not shown on the display screen. Alternatively, sections having the top N, e.g., the top 10, average scores may be chosen for display.

Figure 6:
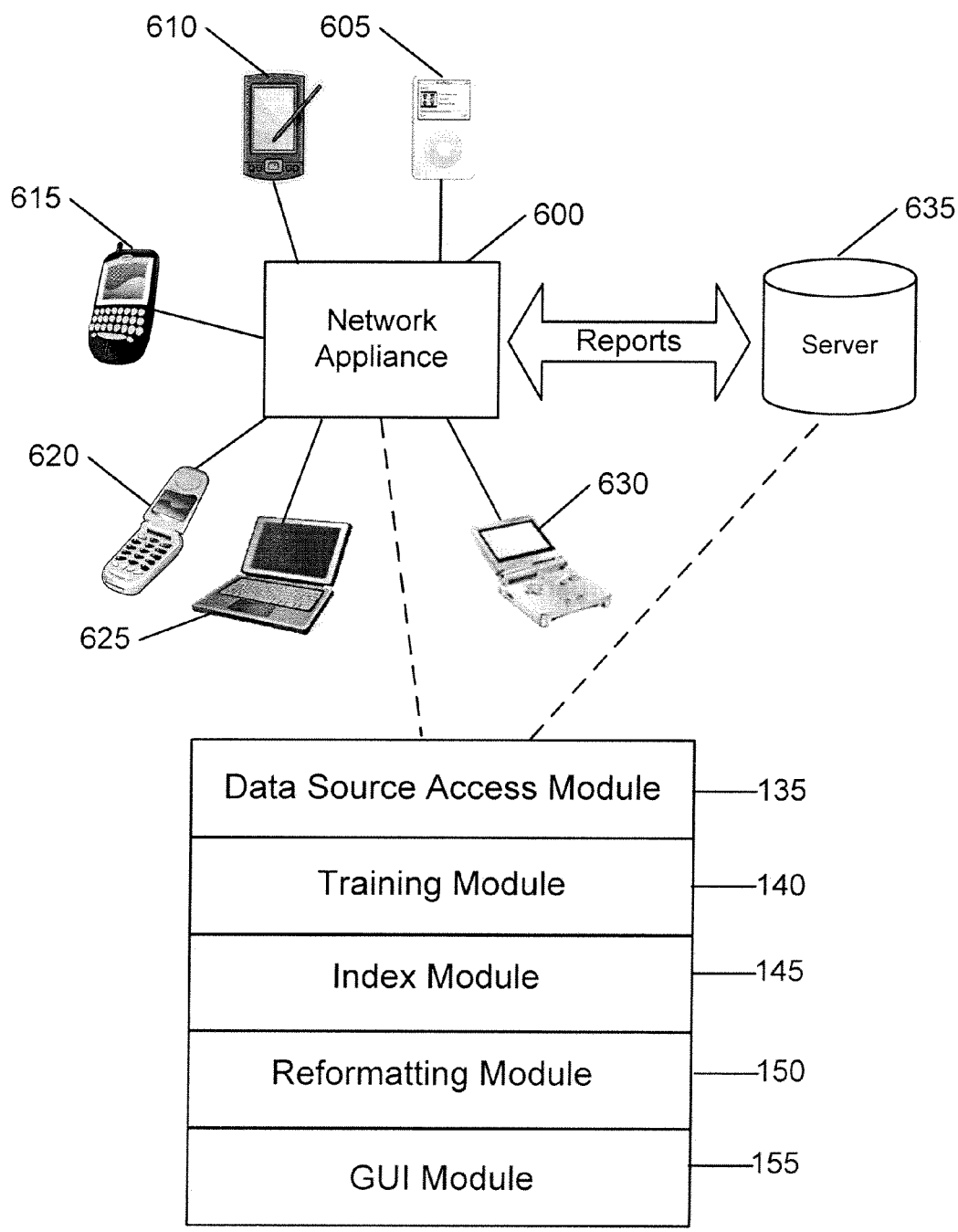
FIG. 6 illustrates a schematic diagram of a network appliance for reformatting reports in accordance to an embodiment of the invention.

Referring now to FIG. 6, a schematic diagram of a network appliance for reformatting reports in accordance to an embodiment of the invention is described. Network appliance 600 comprises an electronic device configured with a network access system. The network access system may be a wired or a wireless connection to a network such as the Internet. For example, network appliance 600 may be an entertainment device 605, a personal digital assistant 610, a mobile device 615, a mobile telephone 620, a portable computer 625, a gaming system 630, or any other electronic device capable of displaying documents in a display screen.

Reports may be reformatted for display on the display screen of the network appliance as described above. The reports may be stored locally on the network appliance 600 or they may be stored in a repository server 635 available to network appliance 600 via the network. Reports are reformatted for display according to the operations of modules 135-155 described above.

One of ordinary skill in the art appreciates that some or all of the functions performed by modules 135-155 may be performed at network appliance 600 and/or repository server 635. It is also appreciated that some or all of the functions performed by modules 135-155 may be performed at a server (not shown) connected to network appliance 600 and repository server 635 via a network.

Figure 7:
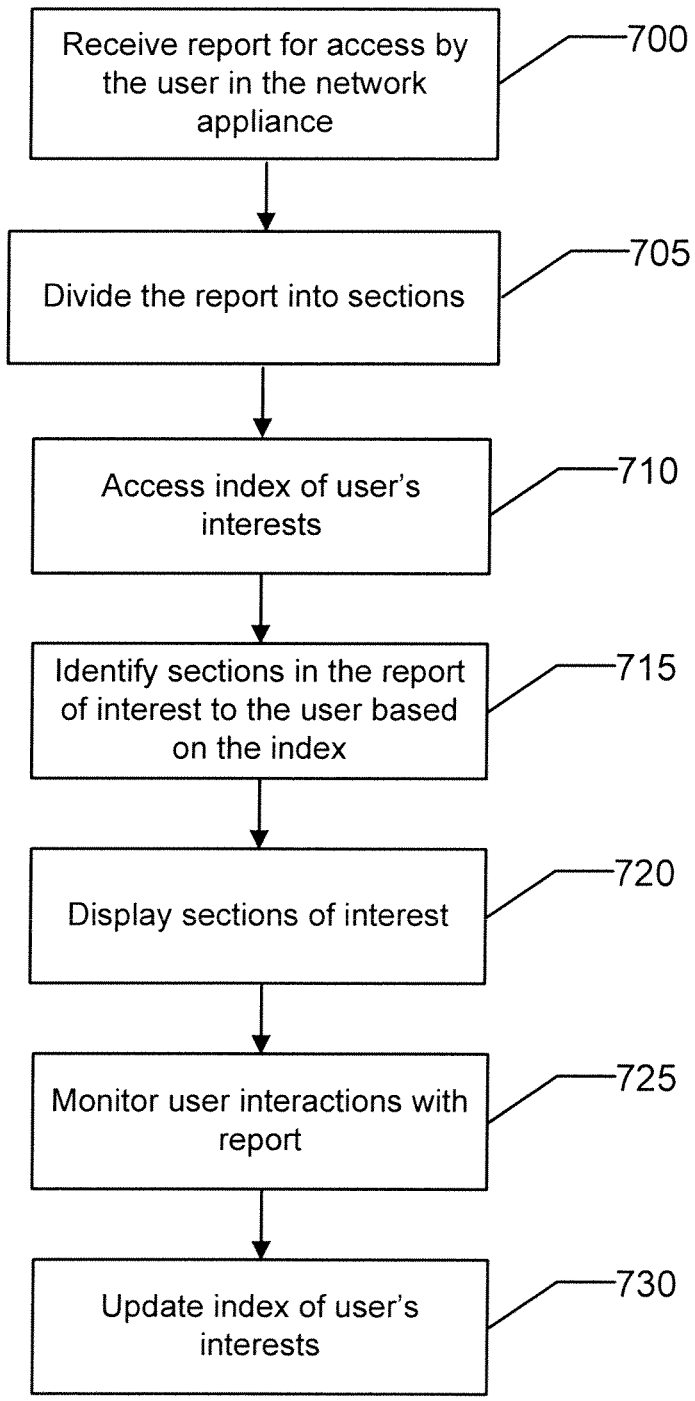
FIG. 7 illustrates a flow chart for reformatting a report for access by a user in a network appliance in accordance to an embodiment of the invention.

Referring now to FIG. 7, a flow chart for reformatting a report for access by a user in a network appliance in accordance to an embodiment of the invention is described. First, a report is received for access by a user in the network appliance (700). The report is then divided into sections (705).

The index of user's interests is accessed to evaluate whether the section is to be displayed to the user (710). As described above, the index may be stored locally in the network appliance or in a repository server accessed by the network appliance via the network. One or more sections in the report are identified as being of interest to the user based on the index (715). This is accomplished by tokenizing the section, computing a section score, and evaluating whether the section score meets a given criterion for display, as described in more detail herein above.

The one or more sections of interest are then displayed to the user on the display screen of the network appliance (720). The user's interactions with the report are monitored to update the index of user's interests (725). The index is updated by updating the interest scores assigned to the report tokens within the report as described above (730). In one embodiment, the index is updated after the user has finished viewing the displayed report, i.e., after the user has closed the report.

Figure 8A:
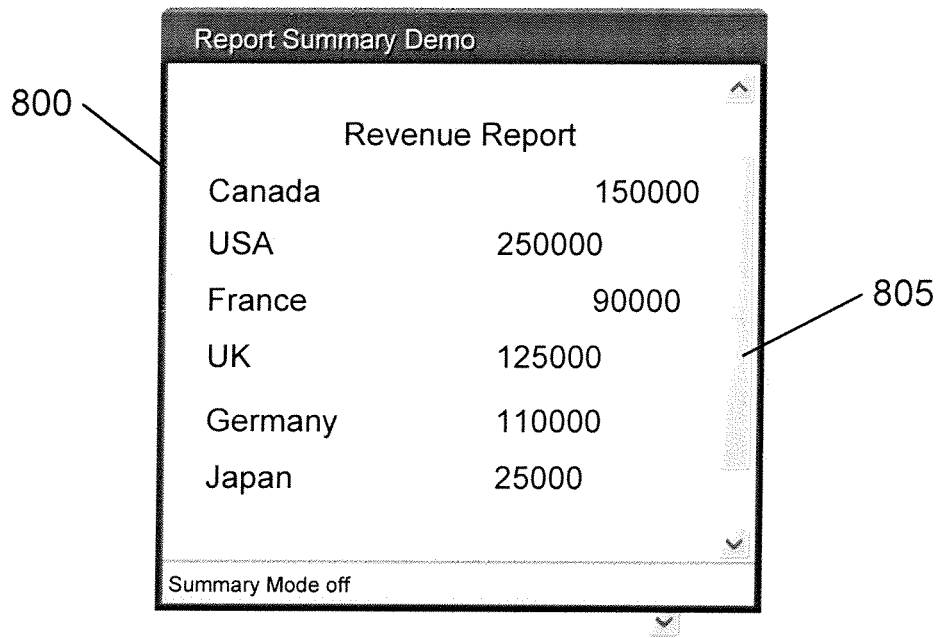
FIGS. 8A-B illustrate an exemplary report and its reformatted version according to an embodiment of the invention.
Figure 8B:
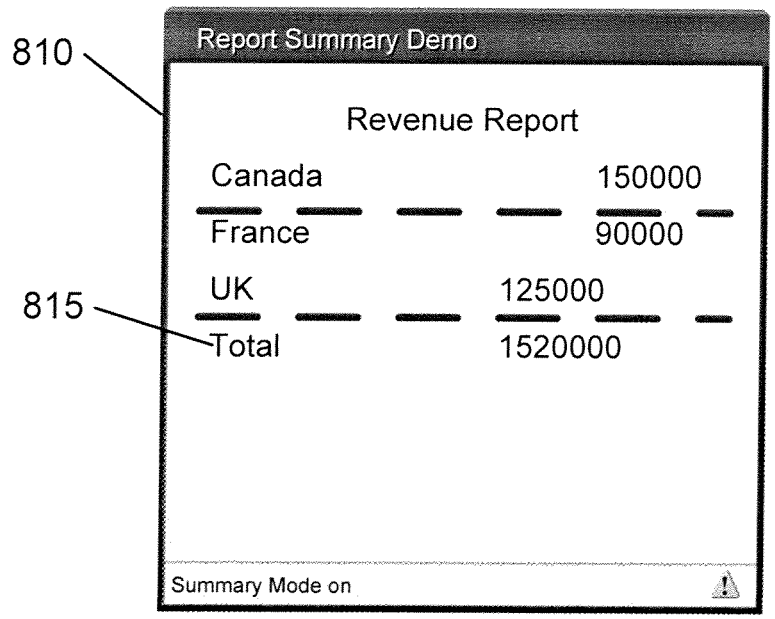

An exemplary report and its reformatted version according to an embodiment of the invention are shown in FIGS. 8A-B. FIG. 8A illustrates a report displayed in a display screen of a network appliance prior to being reformatted for display. Report 800 is shown to extend the display screen due to its large size. If the user desires to view the total revenue for the regions displayed, the user is required to scroll down the screen using scroll down bars 805.

In contrast, FIG. 8B illustrates a report that has been reformatted for the display screen of the network appliance according to embodiments of the invention. Report 810 is shown to include only certain sections of interest to the user. Because only the key information is displayed on the display screen, the report displayed is more compact. For example, the total revenues 815 become visible to the user.

Advantageously, the present invention enables users to remotely access their favorite reports, metrics, and real-time data on various network appliances. Users can intuitively access, navigate and analyze reports with no additional training required. The reports are reformatted for display to ensure that only the key information, i.e., those sections of interest to the user, is displayed.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, comprising executable instructions to:

receive a report at a network appliance of a user, the report including information automatically retrieved from a data source and structured in accordance with a report schema;

divide the report into two or more report sections;

access an index having one or more report tokens each with an interest score and representing one or more interests of the user;

identify within each of the two or more report sections one or more report tokens from the index;

for each of the two or more report sections, generate a token table that lists any of one or more report tokens identified in that section and the interest score for each report token listed in the token table;

calculate a report section interest score for each of the two or more report sections based on the interest scores of the report tokens listed in the token table for that report section;

automatically select one or more report sections according to the report section interest scores; and deliver the one or more report sections to the user.

2. The computer readable storage medium of claim 1, wherein the one or more report tokens comprise individual words within one or more text elements in the report.

3. The computer readable storage medium of claim 2, wherein the one or more text elements are selected from the group consisting of: fixed text elements, text elements from data source fields, formula results, chart titles, and graph titles.

4. The computer readable storage medium of claim 1 further comprising executable instructions to generate the index.

5. The computer readable storage medium of claim 4, wherein the interest score of each of the one or more report tokens is based on previous user interactions by the user with the report token, wherein the previous user interactions are selected from the group consisting of highlighting a report token via a graphical user interface of the network appliance, clicking a report token via the graphical user interface, hovering over a report token via the graphical user interface, revealing a report token via the graphical user interface, and viewing a report token via the graphical user interface for more than a pre-determined time period.

6. The computer readable storage medium of claim 5, wherein the report section interest score for each of the two or more report sections is computed by averaging a portion or all of the interest scores within the token table associated with each report section.

7. The computer readable storage medium of claim 4, wherein, to generate the index, the executable instructions:

receive one or more reports during a training period;

monitor the user's interactions with the one or more reports during the training period;

identify during the training period one or more report tokens within each of the one or more reports based on the user's interactions with the one or more reports;

generate an activity table listing the one or more report tokens identified during the training period and activity scores associated with each of the one or more report tokens; and generate an interest score for each of the one or more report tokens.

8. The computer readable storage medium of claim 7, wherein activity scores associated with each of the one or more report tokens are computed by assigning points to each report token based on the user's interaction with that report token.

9. The computer readable storage medium of claim 7, wherein the interest score for each of the one or more report tokens is computed by dividing the activity score for that report token by the total points assigned to the report with which the activity score is associated.

10. The computer readable storage medium of claim 4, wherein the index generated is unique to a single network appliance.

11. The computer readable storage medium of claim 4, wherein the index generated is unique to the user and usable on multiple network appliances.

12. The computer readable storage medium of claim 1, wherein the executable instructions automatically select one or more report sections for delivery to the user based on whether the report section interest score of each of the two or more report sections satisfies one or more selection criteria.

13. The computer readable storage medium of claim 12, wherein the one or more selection criteria is selected from one of a threshold criterion and a ranking range criterion.

14. The computer readable storage medium of claim 1, further comprising executable instructions to monitor the user's interaction with the report and update the index by updating the interest scores of the one or more report tokens of the index based on the user's interactions with the one or more report tokens.

15. The computer readable storage medium of claim 14, wherein updating the index by updating interest scores of the one or more report tokens of the index occurs after the user is finished interacting with the report.

16. The computer readable storage medium of claim 14, wherein when a report token is encountered for the first time during the user's interaction with the report, the interest score for the report token is initialized to zero.

17. A non-transitory computer readable storage medium, comprising executable instructions to:

generate an index of interest scores for one or more report tokens, the interest scores being calculated by monitoring interaction of a user with one or more reports via a graphical user interface during a training period, wherein during the training period one or more report tokens within each of the one or more reports are identified and used to generate an interest score for each report token;

receive a report at a network appliance of a user after the training period, the report including information automatically retrieved from a data source and structured in accordance with a report schema;

divide the report into two or more report sections;

access the index;

identify within each of the two or more report sections one or more report tokens from the index;

determine a report section interest score for each report section based on the index; and automatically select one or more report sections for display to the user according to a criterion based on the report section interest scores.

18. The computer readable storage medium of claim 17, wherein the one or more report tokens comprise individual words within one or more text elements in a plurality of reports previously accessed by the user.

19. The computer readable storage medium of claim 18, wherein the index is generated based on user interactions with the plurality of reports previously accessed by the user.

20. The computer readable storage medium of claim 19, further comprising executable instructions to assign the interest scores to report tokens accessed during a user interaction.

21. The computer readable storage medium of claim 20, further comprising executable instructions to assign the interest scores to report tokens associated with non-text elements accessed during a user interaction.

22. The computer readable storage medium of claim 21, wherein the executable instructions to assign the interest scores comprise executable instructions to deduct points from report tokens.

23. The computer readable storage medium of claim 22, wherein the index comprises:

a table of report tokens and associated interest scores; and a weighting factor.

24. The computer readable storage medium of claim 23, further comprising executable instructions to update the index based on the user interactions with the report.

25. The computer readable storage medium of claim 24, wherein the interest scores are weighted by the weighting factor, the weighting factor selected based on a number of updates to the index.

26. The computer readable storage medium of claim 25, further comprising executable instructions for allowing the user to select the one or more report sections for display.

27. A method for reformatting a report, comprising:

receiving a report at a network appliance of a user, the report including information automatically retrieved from a data source and structured in accordance with a report schema;

dividing the report into two or more report sections;

accessing an index of interest scores for one or more report tokens, the interest scores being calculated by monitoring interaction of the user with one or more reports via a graphical user interface during a training period, wherein one or more report tokens within each of the one or more reports are identified and used to generate an interest score for each report token;

identifying one or more report sections based on the index of interest scores;

downloading the one or more report sections to the user;

monitoring the user's interactions with the one or more report sections; and updating the index based on the user's interactions.

28. The method of claim 27, wherein the downloading includes downloading to a network appliance selected from the group consisting of a personal computer, a portable wireless device, a wireless telephone, an entertainment device, a gaming system, and a personal digital assistant.

* * * * *